US011048799B2

(12) United States Patent
Yoshimura (10) Patent No.: US 11,048,799 B2
(45) Date of Patent: *Jun. 29, 2021

(54) DYNAMIC MALWARE ANALYSIS BASED ON SHARED LIBRARY CALL INFORMATION

(71) Applicant: FUJITSU LIMITED, Kawasaki (JP)

(72) Inventor: Kunihiko Yoshimura, Katsushika (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/841,466

(22) Filed: Dec. 14, 2017

(65) Prior Publication Data
US 2018/0189492 A1    Jul. 5, 2018

(30) Foreign Application Priority Data

Jan. 5, 2017  (JP) .............................. JP2017-000748

(51) Int. Cl.
G06F 21/56   (2013.01)

(52) U.S. Cl.
CPC .......... G06F 21/566 (2013.01); G06F 21/563 (2013.01); *G06F 2221/034* (2013.01)

(58) Field of Classification Search
CPC ... G06F 21/566; G06F 21/563; G06F 2221/03
See application file for complete search history.

(56) References Cited

U.S. PATENT DOCUMENTS 8,555,385 B1    10/2013  Bhatkar
8,806,641 B1 *  8/2014  Li ....................... G06F 21/564
                                                        717/174

(Continued)

FOREIGN PATENT DOCUMENTS

JP    2004-504662 A    2/2004
JP    2009-037545      2/2009
(Continued)

OTHER PUBLICATIONS

Julia Yu-Chin Cheng, Tzung-Shian Tsai and Chu-Sing Yang, "An information retrieval approach for malware classification based on Windows API calls," 2013 International Conference on Machine Learning and Cybernetics, Tianjin, 2013, pp. 1678-1683. (Year: 2013).*

(Continued)

*Primary Examiner* — Robert B Leung
*Assistant Examiner* — Sameera Wickramasuriya
(74) *Attorney, Agent, or Firm* — Fujitsu Patent Center (57) ABSTRACT

A non-transitory computer-readable storage medium storing a program that causes an information processing apparatus to execute a process, the process includes executing a first program by using a system including a kernel of an operating system (OS) and shared libraries, acquiring first information on a first file group read out from the shared libraries, executing a second program by using the system, acquiring second information on a second file group read out from the shared libraries, executing similarity determination processing of determining similarity between the first program and the second program by comparing the first information and the second information that have been acquired, and outputting the similarity that has been determined.

4 Claims, 8 Drawing Sheets

(56) References Cited

U.S. PATENT DOCUMENTS

| | | | |
|---|---|---|---|
| 8,930,916 | B1 | 1/2015 | Soeder et al. |
| 9,021,589 | B2 | 4/2015 | Anderson |
| 9,558,348 | B1 | 1/2017 | Muttik |
| 9,652,616 | B1* | 5/2017 | Bhatkar .............. G06F 21/566 |
| 9,804,952 | B1 | 10/2017 | Cohen et al. |
| 9,917,855 | B1 | 3/2018 | Li |
| 10,200,390 | B2 | 2/2019 | Rostami-Hesarsorkh et al. |
| 10,230,749 | B1* | 3/2019 | Rostami-Hesarsorkh ................. H04L 63/1425 |
| 10,645,099 | B1 | 5/2020 | Ciubotariu |
| 10,666,677 | B2 | 5/2020 | Casey et al. |
| 2003/0233574 | A1* | 12/2003 | Kouznetsov ............ G06F 21/56 726/23 |
| 2004/0268315 | A1 | 12/2004 | Gouriou et al. |
| 2004/0268317 | A1 | 12/2004 | Gouriou et al. |
| 2005/0246688 | A1 | 11/2005 | Gupta et al. |
| 2005/0257266 | A1 | 11/2005 | Cook et al. |
| 2005/0268338 | A1 | 12/2005 | van der Made |
| 2005/0273858 | A1 | 12/2005 | Zadok et al. |
| 2006/0005085 | A1 | 1/2006 | Zunino et al. |
| 2006/0161985 | A1* | 7/2006 | Zhao .................... G06F 21/566 726/24 |
| 2007/0240217 | A1* | 10/2007 | Tuvell .................... G06F 21/56 726/24 |
| 2007/0240222 | A1* | 10/2007 | Tuvell .................. H04W 12/12 726/24 |
| 2009/0254992 | A1* | 10/2009 | Schultz ................ G06F 21/562 726/24 |
| 2010/0310150 | A1 | 12/2010 | Hayashi et al. |
| 2011/0041179 | A1* | 2/2011 | St hlberg .............. G06F 21/566 726/23 |
| 2012/0102569 | A1 | 4/2012 | Turbin |
| 2012/0324575 | A1 | 12/2012 | Choi et al. |
| 2015/0082441 | A1 | 3/2015 | Gathala |
| 2015/0106931 | A1 | 4/2015 | Mankin et al. |
| 2015/0205962 | A1 | 7/2015 | Swidowski et al. |
| 2015/0264062 | A1 | 9/2015 | Hagiwara et al. |
| 2016/0094564 | A1* | 3/2016 | Mohandas ............ H04L 63/145 726/24 |
| 2016/0292417 | A1 | 10/2016 | Malik et al. |
| 2016/0379136 | A1* | 12/2016 | Chen .................... G06F 21/566 706/12 |
| 2017/0251003 | A1* | 8/2017 | Rostami-Hesarsorkh ................ H04L 63/1425 |
| 2017/0300691 | A1* | 10/2017 | Upchurch ............ G06F 21/563 |
| 2017/0308701 | A1 | 10/2017 | Nandha Premnath |
| 2017/0337371 | A1 | 11/2017 | Amrilloev |
| 2018/0121652 | A1* | 5/2018 | Wang .................... G06F 21/566 |
| 2018/0189490 | A1 | 7/2018 | Maciejak et al. |
| 2018/0300474 | A1 | 10/2018 | Yamada et al. |
| 2019/0303584 | A1 | 10/2019 | Yang |
| 2020/0026854 | A1 | 1/2020 | Guo et al. |
| 2020/0175166 | A1 | 6/2020 | Zhang et al. |

FOREIGN PATENT DOCUMENTS

| | | |
|---|---|---|
| JP | 2009-37545 A | 2/2009 |
| JP | 2010-009269 | 1/2010 |
| JP | 2011-258019 A | 12/2011 |
| JP | 2012-83798 A | 4/2012 |
| JP | 2013-543624 | 12/2013 |
| JP | 2015-79504 A | 4/2015 |
| JP | 2016-038721 | 3/2016 |
| JP | 2016-99857 A | 5/2016 |
| JP | 2016-206950 | 12/2016 |
| WO | 2009/072458 A1 | 6/2009 |
| WO | 2015/045043 A1 | 4/2015 |
| WO | 2016/090289 A1 | 6/2016 |

OTHER PUBLICATIONS

Alazab, Manoun, Robert Layton, Sitalakshmi Venkataraman, and Paul Watters. "Malware detection based on structural and behavioural features of api calls." (Year: 2010).*

J. Upchurch and X. Zhou, "First byte: Force-based clustering of filtered block N-grams to detect code reuse in malicious software," 2013 8th International Conference on Malicious and Unwanted Software: "The Americas" (MALWARE), Fajardo, PR, USA, 2013, pp. 68-76, doi: 10.1109/MALWARE.2013.6703687. (Year: 2013).*

European Office Action dated May 17, 2019 for corresponding European Patent Application No. 17207642.4, 8 pages. Please note D1-D4 cited herewith, were previously cited in an Ids filed on Jul. 2, 2018.

Qiao,Yong et al., "Analyzing Malware by Abstracting the Frequent Itemsets in API call Sequences", 2013 12th IEEE International Conference on Trust, Security and Privacy in Computing and Communications, IEEE, Jul. 16, 2013, pp. 265-270, XP032529512.

Trinius, Philipp et al., "A Malware Instruction Set for Behavior-Based Analysis", Retrieved from the Internet:URL: http://eprints.pascal-network.org/archive/00007694/01/2010-sicherheit.pdf, Dec. 31, 2011, 11 pages. XP055156320.

Shankarapani, Madhu K. et al., "Malware detection using assembly and API call sequences", Journal in Computer Virology, vol. 7, No. 2, Apr. 3, 2010, pp. 107-119, XP055472003.

Extended European Search Report dated May 23, 2018 for corresponding European Patent Application No. 17207642.4, 10 pages.

U.S. Office Action dated Oct. 15, 2019 for copending U.S. Appl. No. 15/843,975, 20 pages.

U.S. Office Action dated Oct. 28, 2019 for copending U.S. Appl. No. 15/844,189, 24 pages.

Hoshizawa, Yuji et al., "Automatic Malware Classification", Research Report of Information Processing Society, Information Processing Society of Japan, Jul. 20, 2007, vol. 2007, No. 71 (2007-CSEC-038), pp. 271-278, with English Translation and Japanese Written Submission of Publication.

Horiai, Keiichi et al., "Proposal and Implementation of Automated Malware Variant Classification Based on Dynamic Behavior", Journal of Information Processing Society [CD-ROM], Information Processing Society of Japan, Apr. 15, 2009, vol. 50, No. 4, pp. 1321-1333, with English Translation and Japanese Written Submission of Publication.

Nakamura et al., "Identification of Subspecific Malware by Utilizing Kullback-Leibler Divergences", Computer Security Symposium, 2013 collection of articles, Information Processing Society of Japan, Oct. 14, 2013, vol. 2013, No. 4, pp. 877-884, with English Translation and Japanese Written Submission of Publication.

Okubo, Ryo et al., "Function Estimation for Malwares Based on Part of Binary Code", Collection of Speech Articles at Forum of Information Science and Technology, Information Processing Society of Japan, Sep. 4, 2012, vol. 11, No. 4, pp. 191-196, with English Translation and Japanese Written Submission of Publication.

Fujino, Akinori et al., "Analysis of Massive Amount of API Call Logs Collected from Automated Dynamic Malware Analysis Systems", Computer Security Symposium, 2013 collection of articles, Information Processing Society of Japan, Oct. 14, 2013, vol. 2013, No. 4, pp. 618-625, with English Translation and Japanese Written Submission of Publication.

Usui et al., "Classification of Malicious Code Using Similarity Analysis of Machine Instruction Sequences", a Collectio of Speech Articles at National Conference of Information Processing Society, Information Processing Society of Japan, Mar. 2, 2011, vol. 73rd, No. 3, pp. 3-489-3-490 with English Translation and Japanese Written Submission of Publication.

Japanese Written Submission of Publication mailed on Nov. 26, 2019 for corresponding Japanese Patent Application No. 2017-00748 with English Translation, 6 pages.

Japanese Written Submission of Publication mailed Nov. 26, 2019 for corresponding Japanese Patent Application No. 2017-000751 with English Translation, 25 pages.

European Office Action dated Jun. 5, 2019 for corresponding European Patent Application No. 17208414.7, 9 pages.

Wagner, Cynthia et al., "Malware analysis with graph kernels and support vector machines", Malicious and Jnwanted Software (MALWARE), 2009 4th International Conference on, IEEE, Oct. 13, 2009, pp. 63-68, XP031622253.

(56) References Cited

OTHER PUBLICATIONS

Hegedus, Jozsef et al., "Methodology for Behavioral-based Malware Analysis and Detection using Random Projections and K-Nearest Neighbors Classifiers", 2011 Seventh International Conference on Computational Intelligence and Security, IEEE, Dec. 3, 2011, pp. 1016-1023, XP032094549.
Lin,Ying-Dar et al., "Three-Phase Detection and Classification for Android Malware Based on Common Behaviors", Journal of Communications Software and Systems, vol. 12, No. 3, Sep. 3, 2016, pp. 157-165, XP055472014.
Extended European Search Report dated May 9, 2018 for corresponding European Patent Application No. 17208414.7, 9 pages.
European Office Action dated Apr. 15, 2020 for corresponding European Patent Application No. 17208414.7, 9 pages.
Rieck, Konrad et al., "Automatic Analysis of Malware Behavior using Machine Learning", Journal of Computer Security, vol. 19, No. 4, Jun. 20, 2011, pp. 639-668, XP055539492.
European Office Action dated Mar. 18, 2020 for corresponding European Patent Application No. 17207642.4, 9 pages.
Cheng et al.; "An Information Retrieval Approach for Malware Classification Based on Wndows API Calls"; 2013; Retrieved from the Internet https://ieeexplore.ieee.org/abstract/documentl6890868; pp. 1-6, as printed. (Year: 2013).
U.S. Office Action dated Apr. 15, 2020 for copending U.S. Appl. No. 15/844,189, 35 pages.
Extended European Search Report dated May 8, 2018 for corresponding European Patent Application No. 17208412.1, 8 pages.
Wijnands, Krijn, "Detecting malware using process tree and process activity data", Feb. 1, 2016, pp. 1-5, XP055471049, Retrieved from the Internet: URL:scientific paper kjwijnands_pdf[retrieved on Apr. 26, 2018].
Anonymous, "Jaccard index—Wikipedia", Dec. 13, 2016, pp. 1-6, XP055470146, Retrieved from the Internet: URL:https://en_wikipedia_ orglwlindex.php?title=Jaccard index&0ldid=754661103 [retrieved on 2018-04-241].
Youngjoon Ki et al., "A Novel Approach to Detect Malware Based on API Call Sequence Analysis", International Journal of Distributed Sensor Networks, vol. 11, No. 6, Jun. 1, 2015 (Jun. 1, 2015), p. 659101, XP055471986. Cited in EPOA dated Oct. 27, 2020 for corresponding European Patent Application No. 17207642.4.
EPOA—European Office Action dated Oct. 27, 2020 for corresponding European Patent Application No. 17207642.4.
Junichi Murakami et al., "Improving accuracy of malware detection by filtering evaluation dataset based on its similarity", Computer Security Symposium 2013, vol. 2013, No. 4, pp. 870-876, with English Abstract.
Takumi Sato et al., "Detecting Malware Variants Using Paragraph Vector", Computer Security Symposium 2016, vol. 2016, No. 2, pp. 298-304, with English Abstract.
JPOA—Japanese Office Action dated Jul. 28, 2020 for corresponding Japanese Patent Application No. 2017-000748 with Machine Translation. ** Non-Patent Literature document Nos. 3, 5, and 7 cited in the JPOA were previously submitted in the IDS filed on Feb. 26, 2020.
Junko Sato et al., "A Study of Characteristic of Malware Based on API Call Sequence and System Load Status Analysis", Computer Security Symposium 2016, vol. 2016, No. 2, pp. 305-309, with English Abstract. Cited in JPOA mailed Jul. 28, 2020 for corresponding Japanese Patent Application No. 2017-00751.
Japanese Office Action dated Jul. 28, 2020 for corresponding Japanese Patent Application No. 2017-00751 with Machine Translation. ** Non- Patent Literature documents Nos. 2, 4, and 6 cited in the JPOA were previously submitted in the IDS filed on Feb. 26, 2020.
USPTO—Notice of Allowance (NOA) dated Feb. 18, 2021 for related U.S. Appl. No. 15/844,189 [allowed]. ** Reference US2015/ 0082441A1 cited in the Notice of Allowance was previously submitted in the IDS filed on Jun. 4, 2020.
EPOA—European Office Action dated Jan. 26, 2021 for corresponding European Patent Application No. 17208414.7. ** References cited in the EPOA were previously submitted in the IDS filed on Oct. 30, 2019.
JPOA—Japanese Office Action dated Mar. 9, 2021 for corresponding Japanese Patent Application No. 2017-000751 with Machine Translation. ** All references cited in the JPOA were previously submitted in the IDS filed on Feb. 26, 2020 and Oct. 27, 2020.
USPTO—Supplemental Notice of Allowance (NOA) dated Mar. 25, 2021 for related U.S. Appl. No. 15/844,189 [allowed].
USPTO—Supplemental Notice of Allowance (NOA) dated Apr. 7, 2021 for related U.S. Appl. No. 15/844,189 [allowed].

* cited by examiner

XXXX.exe PID:1111, Parent PID:2222                                51

| Timestamp | Thread | Function | Arguments | Status | Return |
|---|---|---|---|---|---|
| 10:57:43,805 | 2744 | Nt Open Directory Object | Directory Handle => 0x00000080<br>Desired Access => 15<br>Object Attributes =><br>C:¥Sessions¥1¥BaseNanedObjects | SUCCESS | 0x00000000 |
| 10:57:43,835 | 2744 | Nt Free Virtual Memory | Free Type => 0x00008000<br>Process Handle => 0xffffffff<br>Region Size => 0x00120000<br>Base Address => 0x01930000 | SUCCESS | 0x00000000 |
| 10:57:43,835 | 2744 | Ldr Get Dll Handle | Module Handle => 0x758a0000<br>File Name => kernel32.dll | SUCCESS | 0x00000000 |
| 10:57:43,835 | 2744 | Ldr Get Procedure Address | Ordinal => 0<br>Function Name =><br>Initialize Critical Section AndS<br>pin Count<br>Function Address => 0x758f3939<br>Module Handle => 0x758a0000 | SUCCESS | 0x00000000 |
| 10:57:43,835 | 2744 | Ldr Get Dll Handle | Module Handle => 0x758a0000<br>File Name => kernel32.dll | SUCCESS | 0x00000000 |
| 10:57:43,835 | 2744 | Ldr Get Procedure Address | Ordinal => 0<br>Function Name => FIsAlloc<br>Function Address => 0x758f418d<br>Module Handle => 0x758a0000 | SUCCESS | 0x00000000 |
| 10:57:43,835 | 2744 | Ldr Get Procedure Address | Ordinal => 0<br>Function Name => Fls Get Value<br>Function Address => 0x758f1e16<br>Module Handle => 0x758a0000 | SUCCESS | 0x00000000 |
| 10:57:43,835 | 2744 | Ldr Get Procedure Address | Ordinal => 0<br>Function Name => Fls Set Value<br>Function Address => 0x758f76e6<br>Module Handle => 0x758a0000 | SUCCESS | 0x00000000 |
| ... | ... | ... | ... | ... | ... |

⋮ yXXXX.exe PID: 3333, Parent PID: 2222
yXXXX.exe PID: 4444, Parent PID: 3333
iXXXX.exe PID: 5555, Parent PID: 4444
iXXXX.exe PID: 6666, Parent PID: 5555
sXXXX.exe PID: 7777, Parent PID: 6666
iXXXX.exe PID: 8888, Parent PID: 6666
rXXXX.exe PID: 9999, Parent PID: 6666

SCORE RESULT (300)

IDENTICAL FILES (301)

| No | Campaign | Filename (Sample Type) |
|---|---|---|
| 1 | undefined | iXXXX.exe (unknown) |
| 2 | undefined | iXXXX.exe (unknown) |

STATIC ANALYSIS RESULT (302)

| Rank | Score | Campaign | Filename (Sample Type) |
|---|---|---|---|
| 1 | 6 | campaign_117 | jt153c.exe (goodware) [detail] |
| 2 | 6 | campaign_206 | jt153c.exe (goodware) [detail] |
| 3 | 6 | campaign_229 | jt153c.exe |
| ... | | | |

DYNAMIC ANALYSIS RESULT (303)

| Rank | Score | Campaign | Filename (Sample Type) |
|---|---|---|---|
| 1 (303a) | 56 | Campaign_117 | jt153c.exe (goodware) [detail 303c: src_dst_ip.score:6/7; query_domain. score:1/1; process_score:10/10; api_score:50/50; idll.score:0/50;i] |
| 3 | 56 | campaign_206 | jt153c.exe (goodware) |
| ... | | | |

COSINE SIMILARITY (304)

| Rank | Score | Campaign | Filename (Sample Type) |
|---|---|---|---|
| 1 | 100 | Campaign_117 | jt153c.exe (goodware) [detail 304a: api_cosine_similarity.score:100/10 0,api_cosine_similarity(2-gram).sc ore:100/100] |
| 3 | 100 | campaign_206 | jt153c.exe (goodware) |
| ... | | | |

DYNAMIC MALWARE ANALYSIS BASED ON SHARED LIBRARY CALL INFORMATION

CROSS-REFERENCE TO RELATED APPLICATION

This application is based upon and claims the benefit of priority of the prior Japanese Patent Application No. 2017-000748, filed on Jan. 5, 2017, the entire contents of which are incorporated herein by reference.

FIELD

The embodiments discussed herein are related to a non-transitory computer-readable storage medium, an information processing apparatus and a method.

BACKGROUND

There are conventional methods of detecting malware such as a computer virus, a worm, spyware, and the like that may be illicitly infectious to a device. In one of malware detection methods, an equality or a similarity of a behavior in terms of network address scanning is compared between software that performs an illicit process and software under judgment. In another method, a code is summarized and checked in terms of the equality to a code of malware. A literature of related techniques can be found, for example, in Japanese Patent No. 5083760.

SUMMARY

According to an aspect of the embodiments, a non-transitory computer-readable storage medium storing a program that causes an information processing apparatus to execute a process, the process includes executing a first program by using a system including a kernel of an operating system (OS) and shared libraries, acquiring first information on a first file group read out from the shared libraries, executing a second program by using the system, acquiring second information on a second file group read out from the shared libraries, executing similarity determination processing of determining similarity between the first program and the second program by comparing the first information and the second information that have been acquired, and outputting the similarity that has been determined.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The conventional techniques described above have a problem that it is difficult to detect a lot of various subspecies of malware that may occur from one piece of malware.

For example, subspecies of malware can be relatively easily created from original malware by changing a part, such as an attack target, of the original malware, and thus a lot of various subspecies of malware occur. These subspecies of malware are each different in terms of code and attack targets, and thus it is difficult to detect them by making a comparison with original malware in terms of code or a behavior associated with network address scanning. Furthermore, to detect these subspecies of malware, all subspecies of malware have to be collected, which is not easy to achieve.

In an aspect, it is an object to provide a similarity judgment program, a similarity judgment method, and an information processing apparatus, capable of easily detecting a lot of various subspecies of malware.

A similarity determination program, a similarity determination method, and an information processing apparatus according to embodiments will be described below with reference to the drawings. In the embodiments, a configuration having the same function is given the same symbol and overlapping description is omitted. It is to be noted that, the similarity determination program, the similarity determination method, and the information processing apparatus to be described in the following embodiments merely represent one example and do not limit the embodiments. Furthermore, the following respective embodiments may be combined as appropriate in such a range as not to cause contradiction.

Figure 1:
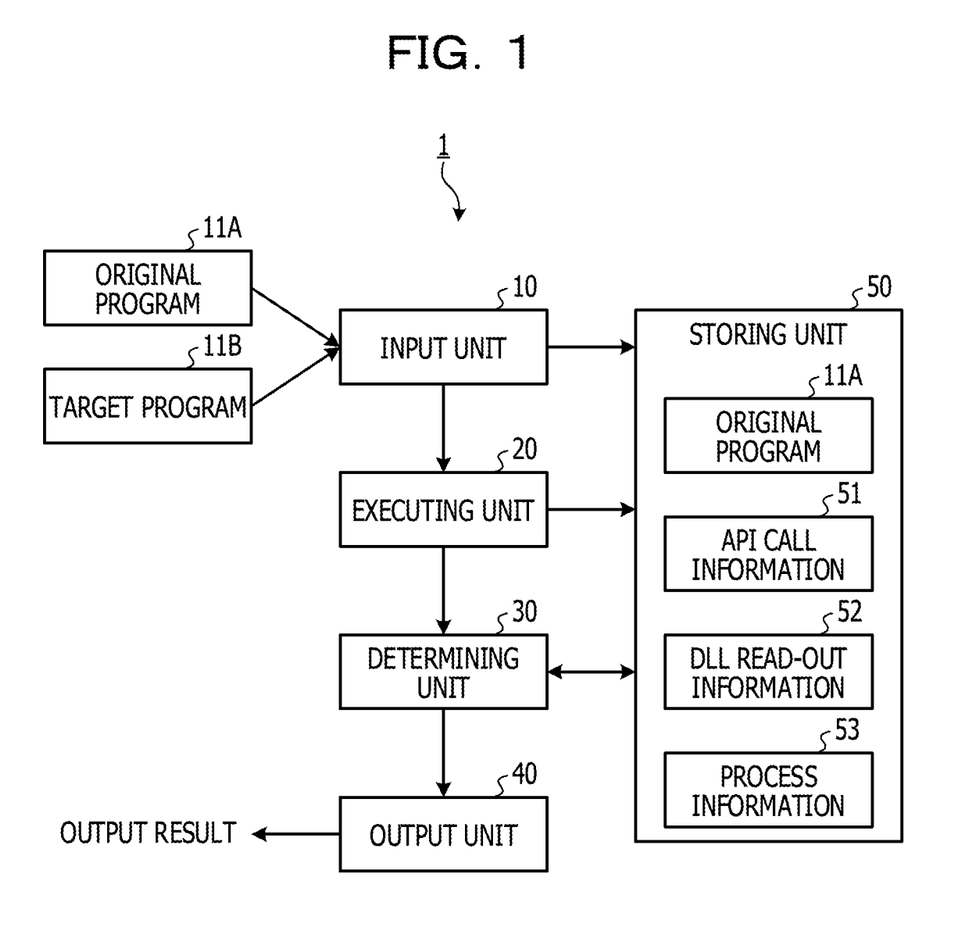
FIG. 1 is a block diagram illustrating an example of a functional configuration of an information processing apparatus according to an embodiment.

FIG. 1 is a block diagram exemplifying a functional configuration of an information processing apparatus according to an embodiment. As illustrated in FIG. 1, an information processing apparatus 1 is an apparatus that accepts an original program 11A that is software that executes illicit processing, such as malware, and serves as the matching source and a target program 11B that becomes a target of determination of whether or not the target program 11B is malware, and carries out matching to output the result of determination to a display or the like. A personal computer (PC) or the like may be applied to the information processing apparatus 1, for example, and the information processing apparatus 1 includes an input unit 10, an executing unit 20, a determining unit 30, an output unit 40, and a storing unit 50.

The input unit 10 accepts input of data through reading of the data from a storage medium such as a semiconductor memory or a digital versatile disc (DVD) or communication with a communication network such as the Internet. For example, the input unit 10 accepts input of the original program 11A and the target program 11B. These original program 11A and target program 11B are one example of a first program and a second program. The input unit 10 outputs the original program 11A and the target program 11B that are accepted to the executing unit 20. Furthermore, the input unit 10 stores the original program 11A in the storing unit 50.

The executing unit 20 is one example of an acquiring unit. The executing unit 20 causes the original program 11A and the target program 11B to be executed under a system environment of a given operating system (OS) and acquires various kinds of information at the time of the execution.

Figure 2:
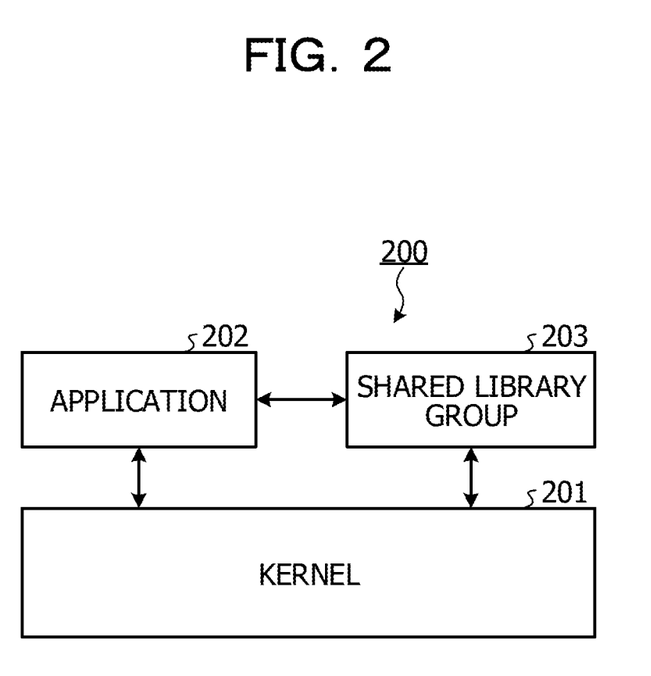
FIG. 2 is a diagram illustrating a system environment.

FIG. 2 is an explanatory diagram for explaining a system environment. As illustrated in FIG. 2, a system environment 200 that executes an application 202 such as the original program 11A or the target program 11B includes a kernel 201 that is the core of the OS and a shared library group 203 composed of various kinds of shared libraries such as a DLL. The system environment 200 is provided by an OS on the information processing apparatus 1 or an OS on a virtual machine implemented by using a virtualization technique in the information processing apparatus 1, for example. It is to be noted that the type of OS may be any of types such as Linux (registered trademark) and Windows (registered trademark).

The executing unit 20 monitors system calls at the time of execution of the application 202 such as the original program 11A or the target program 11B and acquires API call information 51 such as the type of API call that is called by communication with the kernel 201, the number of times of calling, and the order of calling. The executing unit 20 stores the acquired API call information 51 in the storing unit 50 together with an identifier (for example, program name) that indicates the original program 11A or the target program 11B and so forth.

Figure 3:
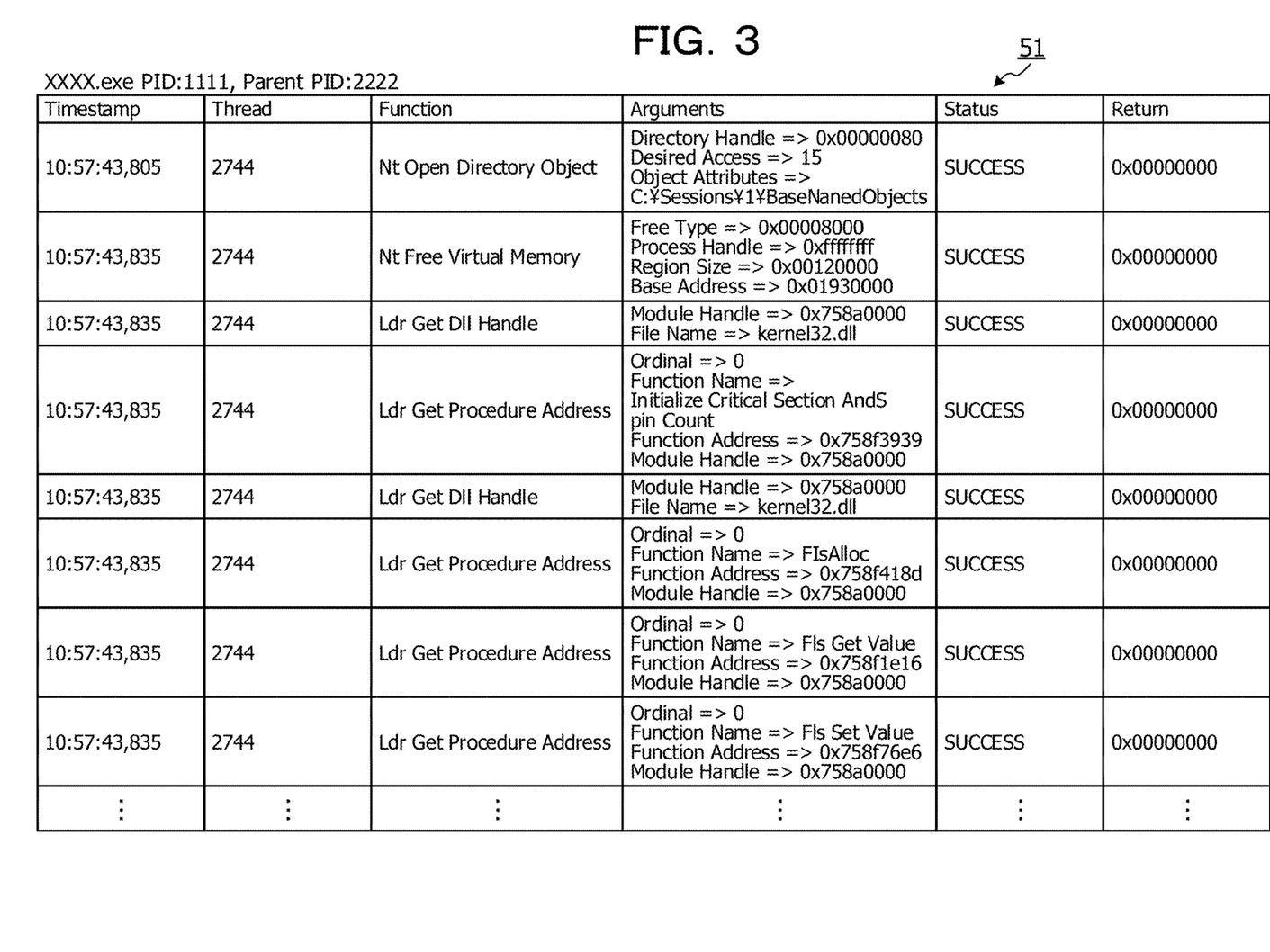
FIG. 3 is a diagram illustrating API call information.

FIG. 3 is an explanatory diagram for explaining the API call information 51. As illustrated in FIG. 3, the API call information 51 includes pieces of information such as "Timestamp," "Thread," "Function," "Arguments," "Status," and "Return" regarding API calls at the time of execution of the application 202.

"Timestamp" indicates the clock time of the API call, for example, the order of calling. "Thread" indicates the thread of the API call and the number of API calls of the same thread represents the number of times of calling. "Function" indicates the function called by the API call. "Arguments" indicates the arguments of the API call. "Status" indicates the states of the API call (for example, success/failure). "Return" indicates the return address of the API call.

Furthermore, the executing unit 20 monitors read-out of the shared library group 203 at the time of execution of the application 202 such as the original program 11A or the target program 11B and acquires DLL read-out information 52 of a file group of the shared libraries read out from the shared library group 203. The executing unit 20 stores the acquired DLL read-out information 52 in the storing unit 50 together with the identifier (for example, program name) that indicates the original program 11A or the target program 11B and so forth.

Figure 4:
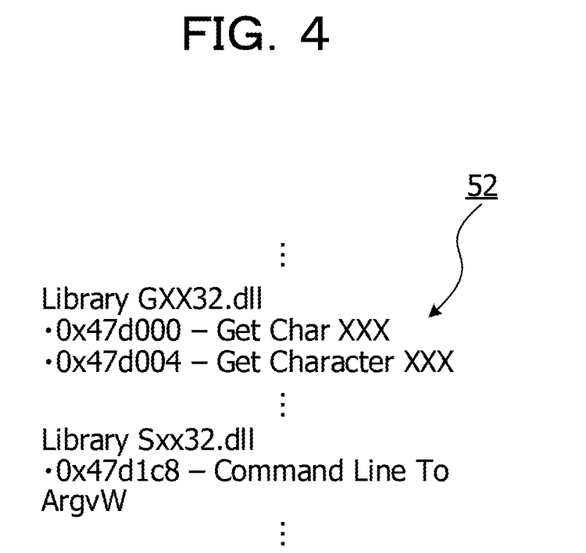
FIG. 4 is a diagram illustrating DLL reading information.

FIG. 4 is an explanatory diagram for explaining the DLL read-out information 52. As illustrated in FIG. 4, the DLL read-out information 52 is a list of the file group ("GXXX32.dll," "Sxx32.dll," . . . and so forth) read out from the shared library group 203 at the time of execution of the application 202. In the list in the DLL read-out information 52, the file group is described in order of read-out.

Furthermore, the executing unit 20 monitors processes at the time of execution of the application 202 such as the original program 11A or the target program 11B and acquires process information 53 of the executed processes. The executing unit 20 stores the acquired process information 53 in the storing unit 50 together with the identifier (for example, program name) that indicates the original program 11A or the target program 11B and so forth.

Figure 5:
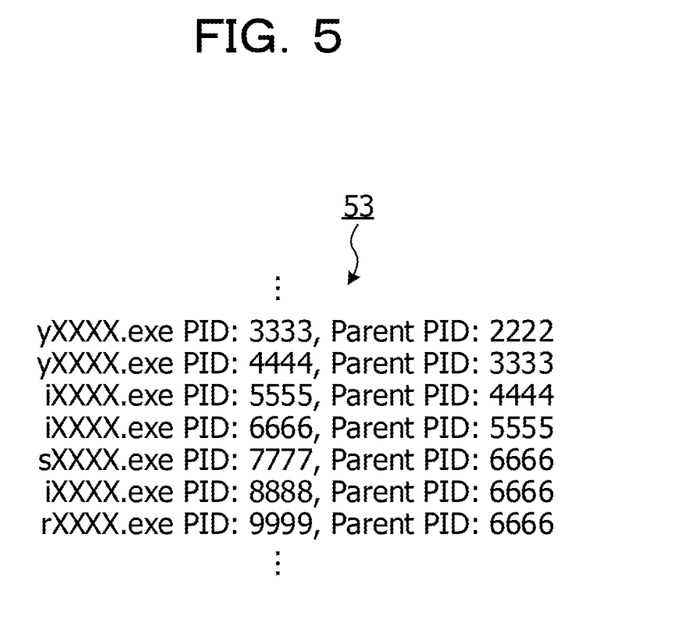
FIG. 5 is a diagram illustrating process information.

FIG. 5 is an explanatory diagram for explaining the process information 53. As illustrated in FIG. 5, the process information 53 is a list of processes at the time of execution of the application 202. For example, the process information 53 includes the process name as the identifier of the process ("yXXXX.exe" or the like) and the process identifier (ID) ("PID: 3333" or the like) and information that indicates the parent process ("Parent PID: 2222" or the like) regarding each process at the time of the execution.

The determining unit 30 determines the similarity between the original program 11A and the target program 11B based on the result of comparison between the code of the original program 11A and the code of the target program 11B and the result of comparison between information acquired at the time of execution of the original program 11A and information acquired at the time of execution of the target program 11B.

For example, the determining unit 30 carries out static analysis in which the similarity that represents the degree of similarity between codes is determined by comparing the code of the original program 11A and the code of the target program 11B, and outputs the analysis result to the output unit 40. Furthermore, the determining unit 30 carries out dynamic analysis in which the information acquired at the time of execution of the original program 11A and the information acquired at the time of execution of the target program 11B are compared and the similarity between these pieces of information is determined, and outputs the analysis result to the output unit 40.

For example, the determining unit 30 compares information on the API call type, the number of times of calling of the API call, or the order of calling of a first API call included in the API call information 51 of the original program 11A and information on the API call type, the number of times of calling of the API call, or the order of calling of the first API call included in the API call information 51 of the target program 11B. Then, the determining unit 30 calculates the similarity that represents the degree of similarity between these pieces of information by carrying out scoring based on consistency/inconsistency between these pieces of information.

For example, the change in subspecific malware from the original malware is only part of the malware, such as the attack target. Thus, the contents of the API calls of the subspecific malware are similar to those of the original malware. Therefore, pieces of subspecific malware that variously derive from the original program 11A may be easily detected by obtaining the similarity between the API call information 51 of the original program 11A that is the matching source and the API call information 51 of the target program 11B. As one example, if the similarity between the API call information 51 of the original program 11A that is the matching source and the API call information 51 of the target program 11B is high (for example, equal to or higher than a given value), it may be determined that the target program 11B is malware.

Furthermore, the determining unit 30 compares the DLL read-out information 52 of the original program 11A and the DLL read-out information 52 of the target program 11B and carries out scoring based on consistency/inconsistency between these pieces of information. Thereby, the determining unit 30 calculates the similarity that represents the degree of similarity between these pieces of information.

For example, the files of shared libraries read out by the original malware and the files of shared libraries read out by subspecific malware are similar to each other. Therefore, pieces of subspecific malware that variously derive from the original program 11A may be easily detected by obtaining the similarity between the DLL read-out information 52 of the original program 11A that is the matching source and the DLL read-out information 52 of the target program 11B. As one example, if the similarity between the DLL read-out information 52 of the original program 11A that is the matching source and the DLL read-out information 52 of the target program 11B is high (for example, equal to or higher than a given value), it may be determined that the target program 11B is malware.

Furthermore, the determining unit 30 may compare information obtained by summarizing the files included in the DLL read-out information 52 of plural original programs 11A as a characteristic and the DLL read-out information 52 of the target program 11B and output the similarity between the plural original programs 11A and the target program 11B.

For example, the determining unit 30 tallies up the appearance frequency of the files included in the DLL read-out information 52 of the plural original programs 11A/appearance frequency of the files in the whole of the plural original programs 11A and so forth and obtains term frequency (TF)/inverse document frequency (IDF), contrast set mining, and so forth. Then, the determining unit 30 compares the TF/IDF and the contrast set mining summarized from the DLL read-out information 52 of the plural original programs 11A and the DLL read-out information 52 of the target program 11B and outputs the similarity between the plural original programs 11A and the target program 11B.

The TF/IDF summarized from the DLL read-out information 52 of the plural original programs 11A represents a characteristic unique to malware. Thus, calculation of the similarity with emphasis on what is characteristic of the malware may be carried out through comparison with the TF/IDF summarized from the DLL read-out information 52 of the plural original programs 11A.

Furthermore, the determining unit 30 compares the process information 53 of the original program 11A and the process information 53 of the target program 11B and carries out scoring based on consistency/inconsistency between these pieces of information. Thereby, the determining unit 30 calculates the similarity that represents the degree of similarity between these pieces of information.

For example, the processes executed by the original malware and the processes executed by subspecific malware are similar to each other. Therefore, pieces of subspecific malware that variously derive from the original program 11A may be easily detected by obtaining the similarity between the process information 53 of the original program 11A that is the matching source and the process information 53 of the target program 11B. As one example, if the similarity between the process information 53 of the original program 11A that is the matching source and the process information 53 of the target program 11B is high (for example, equal to or higher than a given value), it may be determined that the target program 11B is malware.

The output unit 40 outputs the similarity between the original program 11A and the target program 11B determined by the determining unit 30 to a display, a file, or the like. By checking the output similarity, the user may discriminate whether or not the target program 11B is malware.

Furthermore, based on the result of comparison of plural original programs 11A with the target program 11B, the output unit 40 ranks the original programs 11A in decreasing order of the similarity (score). Subsequently, the output unit 40 rearranges the original programs 11A in order of the score (decreasing order) and displays score values that represent the similarity to the target program 11B determined regarding each original program 11A. This allows the user to easily find the original program 11A whose similarity to the target program 11B is high among the plural original programs 11A.

Moreover, based on the result of comparison of plural target programs 11B with the original program 11A, the output unit 40 ranks the target programs 11B in decreasing order of the similarity (score). Subsequently, the output unit 40 rearranges the target programs 11B in order of the score (decreasing order) and displays score values that represent the similarity to the original program 11A determined regarding each target program 11B. This allows the user to easily find the target program 11B whose similarity to the original program 11A is high among the plural target programs 11B. It is to be noted that, in the present embodiment, description will be made by taking as an example the case in which the original programs 11A are rearranged in order of the score to be displayed based on the result of comparison of the plural original programs 11A with the target program 11B.

The storing unit 50 is a storing device such as a hard disk drive (HDD). The storing unit 50 stores the original program 11A that serves as the matching source and the API call information 51, the DLL read-out information 52, and the process information 53 regarding each program.

Figure 6:
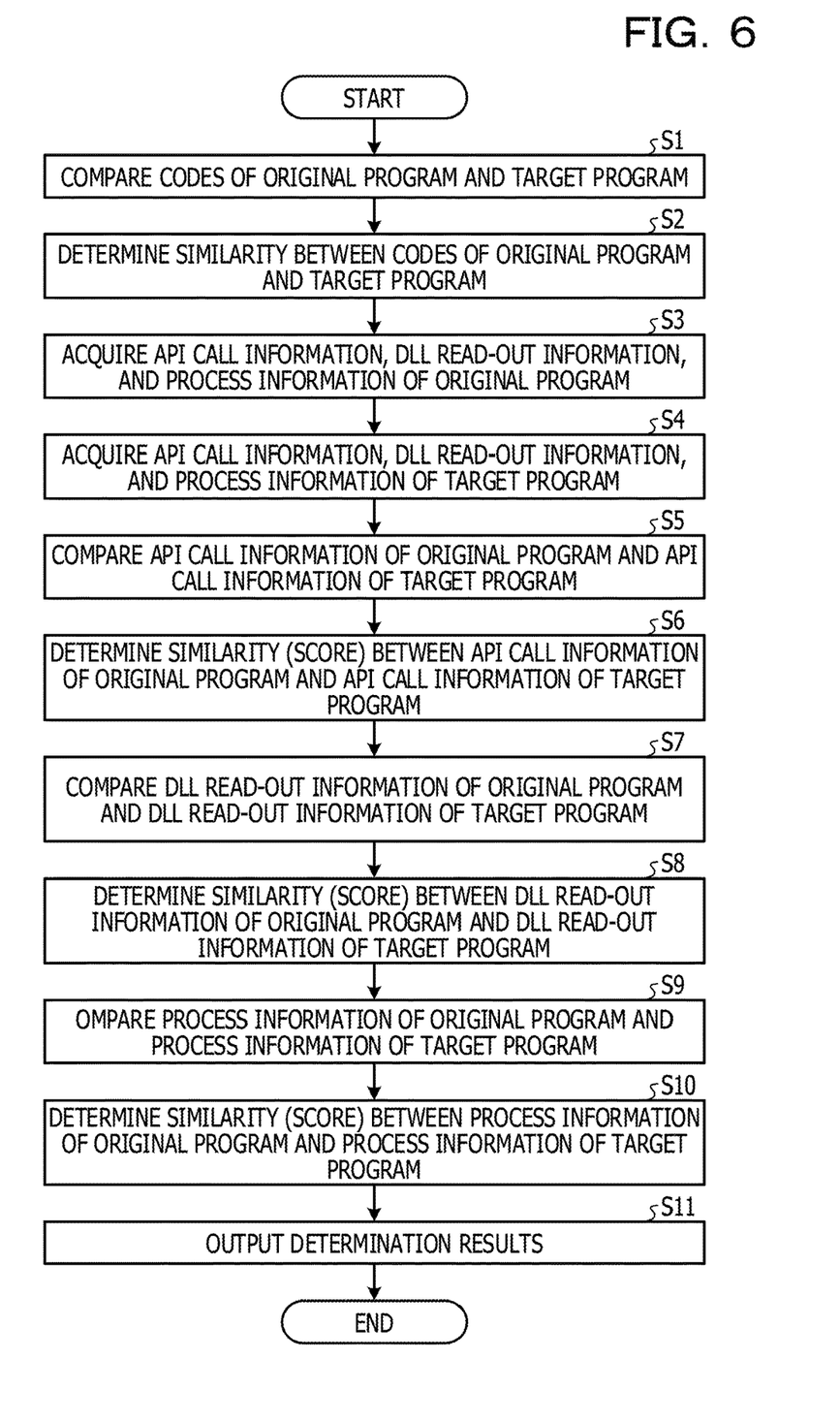
FIG. 6 is a flow chart illustrating an example of an operation of an information processing apparatus according to an embodiment.

FIG. 6 is a flowchart illustrating an operation example of the information processing apparatus 1 according to the embodiment. It is to be noted that suppose that the original program 11A has been input before start of the processing and the original program 11A and the API call information 51, the DLL read-out information 52, and the process information 53 of the original program 11A have been stored in the storing unit 50 (have been acquired). Furthermore, suppose that the target program 11B is input at the time of the start of the processing.

As illustrated in FIG. 6, when the processing is started, the determining unit 30 reads out the original program 11A from the storing unit 50 and compares the codes of the read-out original program 11A and the input target program 11B by using a differencing tool (for example, Diff) (S1).

Subsequently, the determining unit 30 determines the similarity between the code of the original program 11A and the code of the target program 11B from the comparison result of S1 (S2). For example, the determining unit 30 obtains a score that represents the similarity about the code based on the amount of different part detected as the difference by the differencing tool.

Subsequently, the determining unit 30 acquires the API call information 51, the DLL read-out information 52, and the process information 53 of the original program 11A stored in the storing unit 50 (S3).

Subsequently, the executing unit 20 executes the input target program 11B and acquires the API call information 51, the DLL read-out information 52, and the process information 53 of the target program 11B (S4). The executing unit 20 stores the acquired API call information 51, DLL read-out information 52, and process information 53 of the target program 11B in the storing unit 50 and outputs the acquired API call information 51, DLL read-out information 52, and process information 53 to the determining unit 30.

Next, the determining unit 30 compares the API call information 51 of the original program 11A and the API call information 51 of the target program 11B (S5). Subsequently, the determining unit 30 determines the similarity (score) between the API call information 51 of the original program 11A and the API call information 51 of the target program 11B by carrying out scoring based on consistency/inconsistency between these pieces of information (S6).

In the determination of the similarity in S6, the degree of similarity between an N-gram model based on the API call information 51 of the original program 11A and an N-gram model based on the API call information 51 of the target program 11B may be obtained as the score.

For example, the determining unit 30 obtains information obtained by arranging API calls in order of calling (for example, sorting based on "Timestamp" in FIG. 3) based on the API call information 51 of the original program 11A. Then, the determining unit 30 sequentially obtains appearance frequency that represents how often a combination of N API calls appears to obtain the N-gram model based on the API call information 51 of the original program 11A.

Similarly, the determining unit 30 obtains information obtained by arranging API calls in order of calling based on the API call information 51 of the target program 11B. Then, the determining unit 30 sequentially obtains appearance frequency that represents how often a combination of N API calls appears to obtain the N-gram model based on the API call information 51 of the target program 11B. Subsequently, the determining unit 30 converts the degree of similarity between these N-gram models to the score to obtain the similarity. By obtaining the similarity between the N-gram model based on the API call information 51 of the original program 11A and the N-gram model based on the API call information 51 of the target program 11B as above, the similarity when the order of calling of the API calls is considered may be obtained.

Furthermore, in the determination of the similarity in S6, the cosine similarity in a vector space between a vector based on the API call information 51 of the original program 11A and a vector based on the API call information 51 of the target program 11B may be obtained as the score. For example, the determining unit 30 obtains a vector based on the API call type, the number of times of calling of the API call, the order of calling of the API call, or the like included in the API call information 51 of the original program 11A. Furthermore, the determining unit 30 obtains a vector based on the API call type, the number of times of calling of the API call, the order of calling of the API call, or the like included in the API call information 51 of the target program 11B. Subsequently, the determining unit 30 obtains the cosine similarity between these vectors in the vector space. As above, the determining unit 30 may obtain the score based on the cosine similarity.

Next, the determining unit 30 compares the DLL read-out information 52 of the original program 11A and the DLL read-out information 52 of the target program 11B (S7). Subsequently, the determining unit 30 determines the similarity (score) between the DLL read-out information 52 of the original program 11A and the DLL read-out information 52 of the target program 11B by carrying out scoring based on consistency/inconsistency between these pieces of information (S8).

In the determination of the similarity in S8, a set including the files included in the DLL read-out information 52 of the original program 11A as elements and a set including the files included in the DLL read-out information 52 of the target program 11B as elements may be compared and the score that represents the similarity between the sets may be obtained. As this score that represents the similarity between sets, a Jaccard index exists. For example, the determining unit 30 obtains the Jaccard index by regarding the number of elements of the OR of two sets as the denominator and regarding the number of elements of the AND of the two sets as the numerator.

Furthermore, as the score that represents the similarity between sets, the similarity of the order in which files are read out (order of arrangement of the files) exists. For example, the score according to the consistent place of the order of read-out (order of arrangement) of files in sets may be obtained. Moreover, the determining unit 30 may convert the degree of similarity between an N-gram model of information obtained by arranging the files included in the DLL read-out information 52 of the original program 11A in order of read-out and an N-gram model of information obtained by arranging the files included in the DLL read-out information 52 of the target program 11B in order of read-out to the score to obtain the similarity.

As above, the determining unit 30 may obtain the degree of similarity between the set of the files called from the shared library group 203 by the original program 11A and the set of the files called from the shared library group 203 by the target program 11B.

Subsequently, the determining unit 30 compares the process information 53 of the original program 11A and the process information 53 of the target program 11B (S9). Next, the determining unit 30 determines the similarity (score) between the process information 53 of the original program 11A and the process information 53 of the target program 11B by carrying out scoring based on consistency/inconsistency between these pieces of information (S10).

In the determination of the similarity in S10, a set including the processes included in the process information 53 of the original program 11A as elements and a set including the processes included in the process information 53 of the target program 11B as elements may be compared and a Jaccard index that represents the similarity between the sets may be obtained as the score. As above, the determining unit 30 may obtain the degree of similarity between the set of the processes executed by the original program 11A and the set of the processes executed by the target program 11B.

Subsequently, the output unit 40 outputs the determination results of the determination by the determining unit 30 in S2, S6, S8, and S10, for example, the similarities between the original program 11A and the target program 11B, to a display, a file, or the like (S11).

Figure 7:
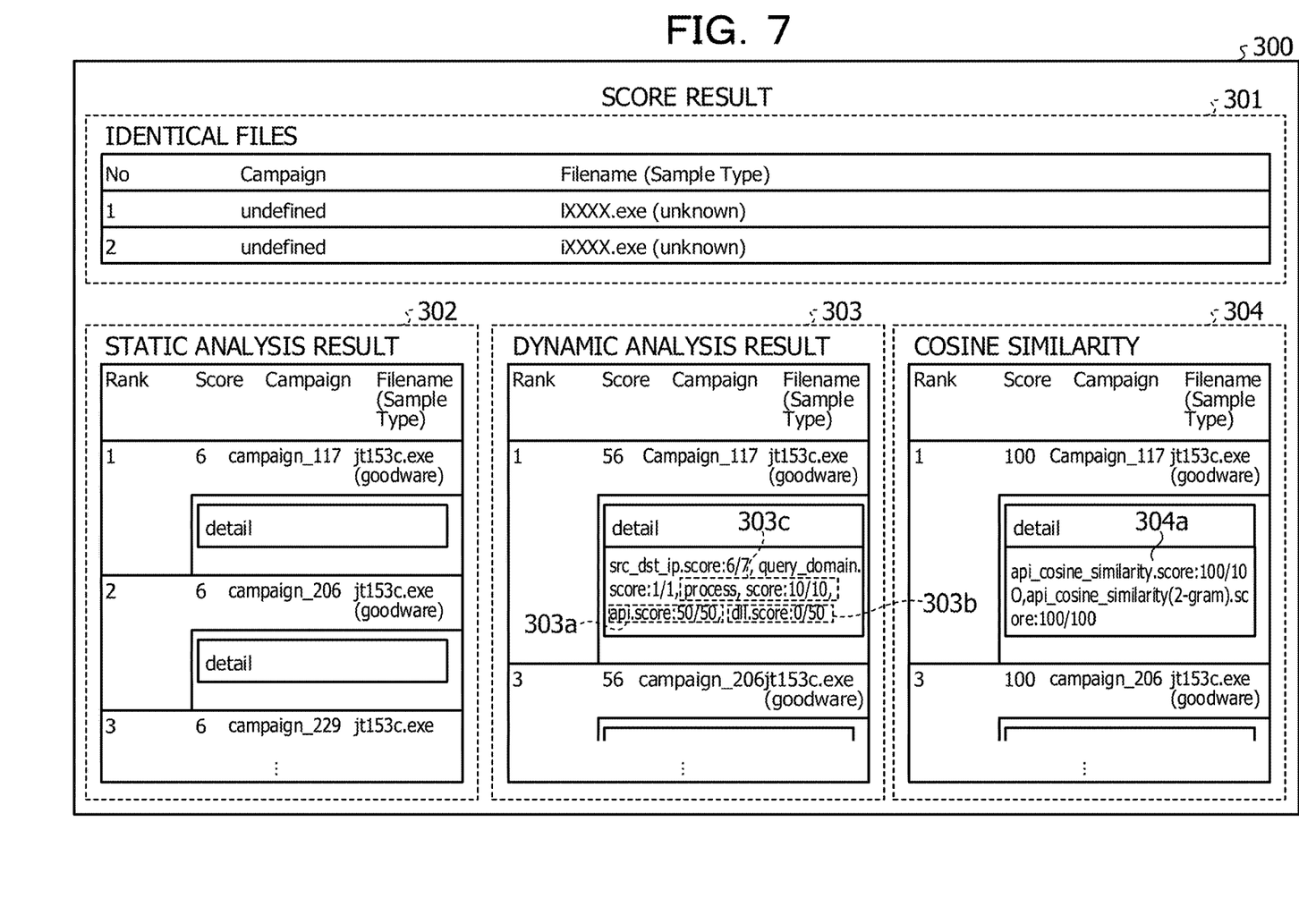
FIG. 7 is a diagram illustrating a result output.

FIG. 7 is an explanatory diagram for explaining result output. As illustrated in FIG. 7, the output unit 40 displays the determination results of the determination by the determining unit 30 in S2, S6, S8, and S10 on a display screen 300. This allows the user to discriminate whether or not the target program 11B is malware.

For example, the display screen 300 includes a file display area 301 and result display areas 302 to 304. The file display area 301 is an area in which the original programs 11A are arranged in decreasing order of the similarity (score) to be displayed based on the result of comparison of the plural original programs 11A with the target program 11B. By the file display area 301, the user may easily come to know the original program 11A whose similarity to the target program 11B is high.

The result display area 302 is an area in which the result of static analysis in which the degree of similarity between the codes of the original program 11A and the target program 11B is analyzed is displayed. By the result display area 302, the user may easily come to know the degree of similarity of the code between the original program 11A and the target program 11B.

The result display area 303 is an area in which the result of dynamic analysis based on comparison between at the time of execution of the original program 11A and at the time of execution of the target program 11B is displayed. For example, the result display area 303 has a score value 303a based on comparison between the API call information 51 of the original program 11A and the API call information 51 of the target program 11B. By the score value 303a, the user may easily come to know the degree of similarity between the contents of API calls at the time of execution of the original program 11A and the contents of API calls at the time of execution of the target program 11B.

Furthermore, the result display area 303 has a score value 303b based on comparison between the DLL read-out information 52 of the original program 11A and the DLL read-out information 52 of the target program 11B. By the score value 303b, the user may easily come to know the degree of similarity between the file group of shared libraries called at the time of execution of the original program 11A and the file group of shared libraries called at the time of execution of the target program 11B.

Moreover, the result display area 303 has a score value 303c based on comparison between the process information 53 of the original program 11A and the process information 53 of the target program 11B. By the score value 303c, the user may easily come to know the degree of similarity between the processes at the time of execution of the original program 11A and the processes at the time of execution of the target program 11B.

The result display area 304 is an area in which a score value 304a of the cosine similarity based on comparison between the API call information 51 of the original program 11A and the API call information 51 of the target program 11B is displayed. By the score value 304a, the user may easily come to know the cosine similarity between the contents of API calls at the time of execution of the original program 11A and the contents of API calls at the time of execution of the target program 11B.

As described above, the information processing apparatus 1 executes the original program 11A under the system environment 200 and acquires the DLL read-out information 52 of the file group read out from the shared library group 203. Furthermore, the information processing apparatus 1 executes the target program 11B under the system environment 200 and acquires the DLL read-out information 52 of the file group read out from the shared library group 203. Moreover, the information processing apparatus 1 compares the DLL read-out information 52 of the original program 11A and the DLL read-out information 52 of the target program 11B and determines the similarity between the original program 11A and the target program 11B according to the comparison result to output the similarity. Therefore, the user may easily detect pieces of malware that variously derive from the original program 11A without collecting all pieces of subspecific malware as the original program 11A.

It is to be noted that the respective constituent elements of each piece of apparatus illustrated in the drawings do not need be configured as illustrated in the drawings physically. For example, concrete forms of distribution and integration of each of apparatus are not limited to the illustrated ones and all or part of each of apparatus may be configured to be distributed or integrated functionally or physically in an arbitrary unit according to various kinds of loads, the status of use, and so forth.

Furthermore, all or an arbitrary part of various kinds of processing functions carried out in the information processing apparatus 1 may be carried out on a central processing unit (CPU) (or microcomputer such as a micro processing unit (MPU) or a micro controller unit (MCU)). Moreover, it goes without saying that all or an arbitrary part of the various kinds of processing functions may be carried out on a program analyzed and executed by the CPU (or microcomputer such as an MPU or MCU) or on hardware based on wired logic. In addition, the various kinds of processing functions carried out in the information processing apparatus 1 may be executed by plural computers in cooperation based on cloud computing.

Figure 8:
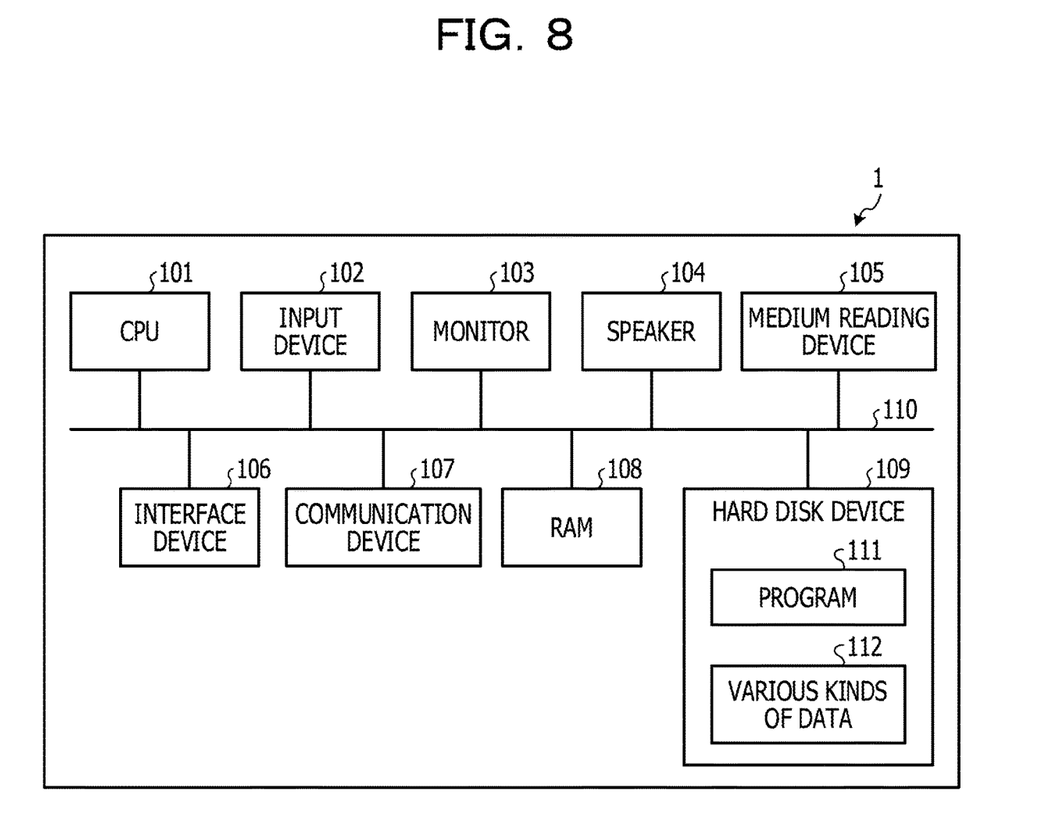
FIG. 8 is block diagram illustrating an example of a hardware configuration of an information processing apparatus according to an embodiment.

Incidentally, various kinds of processing explained in the above-described embodiment may be implemented by executing a program prepared in advance by a computer. Therefore, in the following, one example of a computer (hardware) that executes a program having similar functions to the above-described embodiment will be described. FIG. 8 is a block diagram illustrating a hardware configuration example of the information processing apparatus 1 according to the embodiment.

As illustrated in FIG. 8, the information processing apparatus 1 includes a CPU 101 that executes various kinds of arithmetic processing, an input device 102 that accepts data input, a monitor 103, and a speaker 104. Furthermore, the information processing apparatus 1 includes a medium reading device 105 that reads a program and so forth from a storage medium, an interface device 106 for coupling to various kinds of devices, and a communication device 107 for communication coupling with external equipment by a wired or wireless measure. Moreover, the information processing apparatus 1 includes a random access memory (RAM) 108 that temporarily stores various kinds of information and a hard disk device 109. Furthermore, the respective units (101 to 109) in the information processing apparatus 1 are coupled to a bus 110.

In the hard disk device 109, a program 111 for executing various kinds of processing in the input unit 10, the executing unit 20, the determining unit 30, and the output unit 40 explained in the above-described embodiment is stored. Furthermore, various kinds of data 112 to which the program 111 refers are stored in the hard disk device 109. The input device 102 accepts input of operation information from an operator of the information processing apparatus 1, for example. The monitor 103 displays various kinds of screens operated by the operator, for example. To the interface device 106, a printing device and so forth are coupled, for example. The communication device 107 is coupled to a communication network such as a local area network (LAN) and exchanges various kinds of information with external equipment through the communication network.

The CPU 101 executes various kinds of processing by reading out the program 111 stored in the hard disk device 109 and loading the program 111 into the RAM 108 to execute the program. It is to be noted that the program 111 does not have to be stored in the hard disk device 109. For example, the program 111 stored in a storage medium readable by the information processing apparatus 1 may be read out and executed. To the storage medium readable by the information processing apparatus 1, portable recording media such as compact disc read-only memory (CD-ROM), DVD disc, and universal serial bus (USB) memory, semiconductor memories such as flash memory, hard disk drives, and so forth correspond, for example. Furthermore, the program 111 may be stored in a device coupled to a public line, the Internet, a LAN, or the like and the information processing apparatus 1 may read out the program 111 from this communication network and execute the program 111.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes an information processing apparatus to execute a process, the process comprising:
   executing a plurality of first programs by using a system including a kernel of an operating system (OS) and shared libraries;
   acquiring a plurality of pieces of first order information, each of the plurality of pieces of first order information indicating order of reading out a first file group from the shared libraries;
   calculating a plurality of first N-gram models of the first file group, each of the plurality of first N-gram models being based on each of the plurality of pieces of first order information, each of the first N-gram model being information in which API Calls are arranged in a calling order and includes first information being combination of N API Calls;
   executing a second program by using the system;
   acquiring second order information indicating order of reading out a second file group from the shared libraries;
   calculating second N-gram model of the second file group based on the second order information, the second N-gram model is information in which API Calls are arranged in the calling order and includes a second information being combination of N API Calls;
   making a comparison between a first N-gram model and the second N-gram model according the first information and the second information;
   determining first similarity between each of a plurality of first codes and a second code, each of the plurality of first codes being a code included in any of the plurality of the first programs, the second code being a code included in the second program;
   determining second similarity between the first program and the second program based on the comparison;
   sorting the plurality of first programs in descending order of similarity to the second program based on the first similarity and the second similarity; and
   outputting a result of the sorting.

2. The non-transitory computer-readable storage medium according to claim 1, wherein, the comparison is based on appearance frequency of the first combination of N API Calls and the appearance frequency of the second combination of N API Calls.

3. An information processing apparatus comprising:
   a memory; and
   a processor coupled to the memory and configured to:
   execute a plurality of first programs by using a system including a kernel of an operating system (OS) and shared libraries;
   acquiring a plurality of pieces of first order information, each of the plurality of pieces of first order information indicating order of reading out a first file group from the shared libraries;
   calculate a plurality of first N-gram models of the first file group, each of the plurality of first N-gram models being based on each of the plurality of pieces of first order information, each of the first N-gram model being information in which API Calls are arranged in a calling order and includes first information being combination of N API Calls;
   execute a second program by using the system; acquiring second order information indicating order of reading out a second file group from the shared libraries;
   calculate second N-gram model of the second file group based on the second order information, the second N-gram model is information in which API Calls are arranged in the calling order and includes a second information being the combination of N API Calls;
   make a comparison between a first N-gram model and the second N-gram model according the first information and the second information;
   determine first similarity between each of a plurality of first codes and a second code, each of the plurality of first codes being a code included in any of the plurality of the first programs, the second code being a code included in the second program;
   determine second similarity between the first program and the second program based on the comparison;
   sort the plurality of first programs in descending order of similarity to the second program based on the first similarity and the second similarity; and
   output a result of the sort.

4. A method executed by a computer, the method comprising:
   executing a plurality of first program programs by using a system including a kernel of an operating system (OS) and shared libraries;
   acquiring a plurality of pieces of first order information, each of the plurality of pieces of first order information indicating order of reading out a first file group from the shared libraries;
   calculating a plurality of first N-gram models of the first file group, each of the plurality of first N-gram models being based on each of the plurality of pieces of first order information, each of the first N-gram model being information in which API Calls are arranged in a calling order and includes first information being the combination of N API Calls;
   executing a second program by using the system;
   acquiring second order information indicating order of reading out a second file group from the shared libraries;
   calculating second N-gram model of the second file group based on the second order information, the second N-gram model is information in which API Calls are arranged in the calling order and includes a second information being the combination of N API Calls;
   making a comparison between a first N-gram model and the second N-gram model according the first information and the second information;
   determining first similarity between each of a plurality of first codes and a second code, each of the plurality of first codes being a code included in any of the plurality of the first programs, the second code being a code included in the second program;
   determining second similarity between the first program and the second program based on the comparison;
   sorting the plurality of first programs in descending order of similarity to the second program based on the first similarity and the second similarity; and
   outputting a result of the sorting.

* * * * *